(12) United States Patent
Shuji et al.

(10) Patent No.: US 11,493,228 B2
(45) Date of Patent: Nov. 8, 2022

(54) VENTILATION SYSTEM AND HEAT EXCHANGE-TYPE VENTILATION DEVICE

(71) Applicant: Panasonic Intellectual Property Management Co., Ltd., Osaka (JP)

(72) Inventors: Kenta Shuji, Aichi (JP); Daisuke Hashino, Aichi (JP); Masayuki Sasaki, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 594 days.

(21) Appl. No.: 16/490,571

(22) PCT Filed: Mar. 28, 2018

(86) PCT No.: PCT/JP2018/012677
§ 371 (c)(1),
(2) Date: Sep. 2, 2019

(87) PCT Pub. No.: WO2018/181442
PCT Pub. Date: Oct. 4, 2018

(65) Prior Publication Data
US 2020/0072490 A1    Mar. 5, 2020

(30) Foreign Application Priority Data
Mar. 31, 2017  (JP) .............................. JP2017-069653

(51) Int. Cl.
*F24F 7/08* (2006.01)
*F24F 12/00* (2006.01)
(Continued)

(52) U.S. Cl.
CPC ............ *F24F 12/006* (2013.01); *F24C 15/20* (2013.01); *F24F 7/007* (2013.01); *F24F 7/08* (2013.01); *F24F 2012/007* (2013.01)

(58) Field of Classification Search
CPC ........ F24F 12/001; F24F 12/006; F24F 7/007; F24F 7/06; F24F 7/08; F24C 15/20
(Continued)

(56) References Cited

U.S. PATENT DOCUMENTS 9,494,324 B2 * 11/2016  Livchak .............. F24C 15/2042
10,794,605 B2 * 10/2020  Coogan .................... F24F 7/00
(Continued)

FOREIGN PATENT DOCUMENTS

JP        S63-204048 A      8/1988
JP        2006-46731 A      2/2006
(Continued)

OTHER PUBLICATIONS

International Search Report for corresponding Application No. PCT/JP2018/012677, dated Jun. 12, 2018.

*Primary Examiner* — Ko-Wei Lin
(74) *Attorney, Agent, or Firm* — Renner, Otto, Boisselle & Sklar, LLP

(57)    ABSTRACT

The range hood unit includes a range hood transmitting unit configured to transmit information on an exhaust volume. The heat exchanging ventilation device (1) includes: a heat exchanger receiving unit (19) configured to receive the information from the range hood transmitting unit; and a heat exchanger control unit (17) configured to determine the operation of the heat exchanging ventilation device (1), based on the information received by the heat exchanger receiving unit (19). Based on the exhaust volume of the range hood unit that has been received by the heat exchanger receiving unit (19), the ventilation system exhausts air by subtracting the exhaust volume of the range hood unit from an exhaust volume equivalent to the air supply volume of the heat exchanging ventilation device (1).

13 Claims, 8 Drawing Sheets

(51) Int. Cl.
*F24C 15/20* (2006.01)
*F24F 7/007* (2006.01)

(58) Field of Classification Search
USPC .......................... 454/234, 235, 238, 239, 25
See application file for complete search history.

(56) References Cited

U.S. PATENT DOCUMENTS

| | | | | |
|---|---|---|---|---|
| 2005/0279845 | A1* | 12/2005 | Bagwell | B08B 15/00 62/157 |
| 2007/0125364 | A1* | 6/2007 | Crnkovich | F24C 15/2021 126/299 R |
| 2011/0053488 | A1* | 3/2011 | Gans | F23L 17/005 454/343 |
| 2011/0111689 | A1* | 5/2011 | Takeuchi | F24F 11/30 454/239 |
| 2011/0284091 | A1* | 11/2011 | Livchak | F24C 15/2042 126/299 R |
| 2012/0270488 | A1* | 10/2012 | Fujimura | F24F 11/0001 454/56 |
| 2013/0303074 | A1* | 11/2013 | Sakai | F24F 11/30 454/256 |
| 2014/0260362 | A1* | 9/2014 | Jung | F28D 9/0031 165/135 |

FOREIGN PATENT DOCUMENTS

| | | | |
|---|---|---|---|
| JP | 2010145065 | * | 6/2010 |
| JP | 2010-145065 A | | 7/2010 |
| JP | 2017-26273 A | | 2/2017 |

* cited by examiner

VENTILATION SYSTEM AND HEAT EXCHANGE-TYPE VENTILATION DEVICE

TECHNICAL FIELD

The present disclosure relates to a heat exchanging ventilation device and a ventilation system including the heat exchanging ventilation device.

BACKGROUND ART

There is known a conventional heat exchanging ventilation device that includes: a unit configured to discharge indoor air to the outside of a building; a unit configured to supply outdoor air to the inside of the building; and a heat exchange element, and is configured to switch between operation modes in accordance with the concentration of at least one of gas and particles inside the building.

For example, as illustrated in FIG. 8, a conventional heat exchanging ventilation device includes exhaust damper 102 provided in exhaust duct 101 and configured to change the state of the duct, and thus the conventional heat exchanging ventilation device switches between operation modes, based on the results of detection by concentration sensor 104 and indoor temperature sensor 105 which are provided in indoor inlet port 103 (for example, refer to Patent Literature 1).

CITATION LIST

Patent Literature 1: Unexamined Japanese Patent Publication No. 2017-26273

SUMMARY OF INVENTION

There is a problem that, in the case where such a conventional heat exchanging ventilation device is used in a kitchen of a residence in which at least one of hazardous gas and particles is generated in large amounts, the kitchen is put under negative pressure when a range hood fan operates.

When the range hood fan starts operation, for example, the kitchen is put under negative pressure because the volume of exhaust by the range hood fan is different from the volume of air supplied by the heat exchanging ventilation device from the outside of the building. Accordingly, a door is hard to open and close, and sometimes the door is opened or closed by itself.

To solve the above-described problem, an object of the present disclosure is to prevent the interior of a building from being put under negative pressure by adjusting the volume of supplied air and the volume of exhaust inside the building.

To achieve the object, a ventilation system according to the present disclosure includes a range hood unit configured to exhaust air and a heat exchanging ventilation device configured to supply and exhaust air. The range hood unit includes a range hood transmitting unit configured to transmit information on the operation of the range hood unit. The heat exchanging ventilation device includes: a heat exchanger receiving unit configured to receive the information from the range hood transmitting unit; and a heat exchanger control unit configured to operate the heat exchanging ventilation device, based on the information received by the heat exchanger receiving unit. Thus, a ventilation system achieves the desired object.

According to the ventilation system to according to the present disclosure, even when the range hood unit starts operation, the inside of the building can be prevented from being put under negative pressure by controlling the volume of supplied air and the volume of exhaust air in the inside of a building.

DESCRIPTION OF EMBODIMENTS

Figure 1:
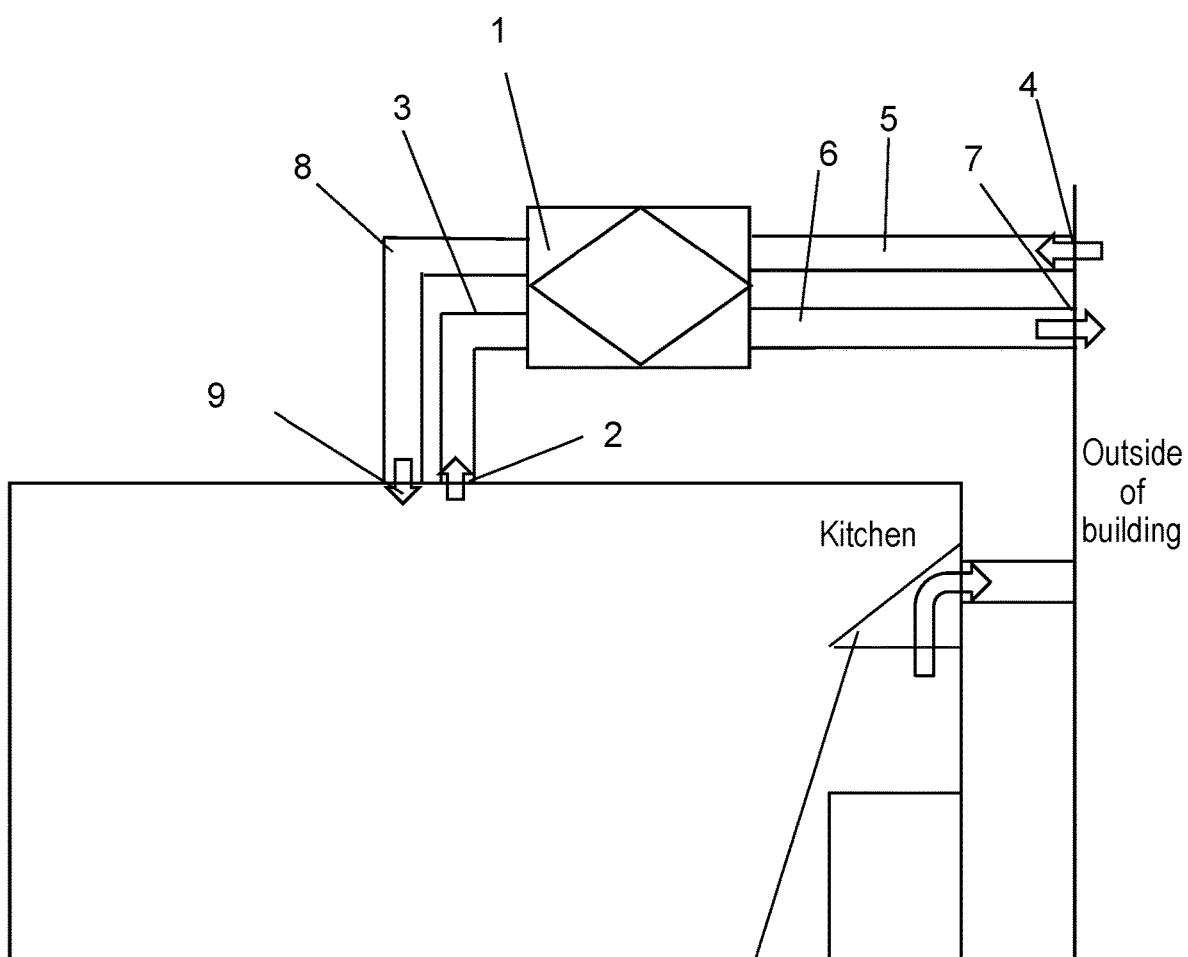
FIG. 1 is a schematic structural diagram illustrating a structure around a kitchen according to Embodiment 1 of the present disclosure.

Hereinafter, with reference to the drawings, embodiments of the present disclosure will be described to provide an understanding of the present disclosure. Note that the following embodiments are merely specific examples of the present disclosure, and do not limit the technical scope of the present disclosure. In all of the drawings, the same constituent elements will be given the same reference numerals, respectively, and the repetition of the same description thereof will be avoided. Furthermore, in each of the drawings, detailed descriptions of constituent elements that are not directly related to the present disclosure will be omitted.

Embodiment 1

FIG. 1 is a schematic structural diagram illustrating a structure around a kitchen equipped with a ventilation system according to the present embodiment.

The ventilation system includes heat exchanging ventilation device 1 configured to supply and exhaust air and range hood unit 24 configured only to exhaust air. Heat exchanging ventilation device 1 operates all the time, for example, in accordance with regulations enacted by the country, or operates for many hours until the volume of exhaust exceeds a predetermined exhaust volume. In contrast, compared to the case of heat exchanging ventilation device 1, range hood unit 24 usually appropriately operates based on a resident's operation, only for shorter hours during cooking, for example.

Heat exchanging ventilation device 1 is, for example, mounted in a ceiling space of a building and configured to ventilate an indoor space including a kitchen. Heat exchanging ventilation device 1 is connected to indoor-side exhaust duct 3, outdoor-side exhaust duct 6, outdoor-side air supply duct 5, and indoor-side air supply duct 8 each being arranged in the ceiling space, for example.

Indoor-side exhaust duct 3 is an air duct one end of which is connected to indoor-side exhaust port 2 and another end of which is connected to indoor-side inlet port 13 described later, and is configured to draw indoor air into heat exchanging ventilation device 1. Indoor-side exhaust port 2 is an opening provided in the indoor space including the kitchen and configured to exhaust indoor air.

Outdoor-side exhaust duct 6 is an air duct one end of which is connected to outdoor-side outlet port 12 described later and another end of which is connected to outdoor-side exhaust port 7, and is configured to exhaust air drawn into heat exchanging ventilation device 1 to the outside of the building.

Outdoor-side exhaust port 7 is an opening provided in, for example, the external wall surface of a building and configured to discharge the air to the outside of the building.

Outdoor-side air supply duct 5 is an air duct one end of which is connected to outdoor-side air supply port 4 and another end of which is connected to outdoor-side inlet port 11 described later, and is configured to draw outdoor air into heat exchanging ventilation device 1. Outdoor-side air supply port 4 is an opening provided in, for example, the external wall surface of the building and configured to draw in outdoor air.

Indoor-side air supply duct 8 is an air duct one end of which is connected to indoor-side outlet port 14 described later and another end of which is connected to indoor-side air supply port 9, and is configured to blow indoor air, having been drawn into heat exchanging ventilation device 1, to the inside of the building. Indoor-side air supply port 9 is an opening provided in the indoor space including the kitchen and configured to draw air into the inside of the building.

In FIG. 1, indoor-side outlet port 2 and indoor-side air supply port 9 are provided in the ceiling of the kitchen, but alternatively may be provided to a place, such as a wall surface, that allows indoor air to be drawn.

Furthermore, indoor-side outlet port 2 and indoor-side air supply port 9 are provided in one place of the kitchen, but may be provided in two or more places thereof.

Heat exchanging ventilation device 1 draws indoor air from indoor-side outlet port 2 via indoor-side exhaust duct 3 into heat exchanging ventilation device 1. At the same time, heat exchanging ventilation device 1 draws outdoor air from outdoor-side air supply port 4 via outdoor-side air supply duct 5 into heat exchanging ventilation device 1.

Air drawn from the inside of the building is discharged through outdoor-side exhaust duct 6 from outdoor-side exhaust port 7 to the outside of the building. Air drawn from the outside of the building is drawn through indoor-side air supply duct 8 from indoor-side air supply port 9 into the inside of the building. Thus, heat exchanging ventilation device 1 replaces air in the indoor space including the kitchen with outdoor air.

Range hood unit 24 is disposed, for example, above a cooking range in the kitchen to exhaust air in the indoor space.

Figure 2:
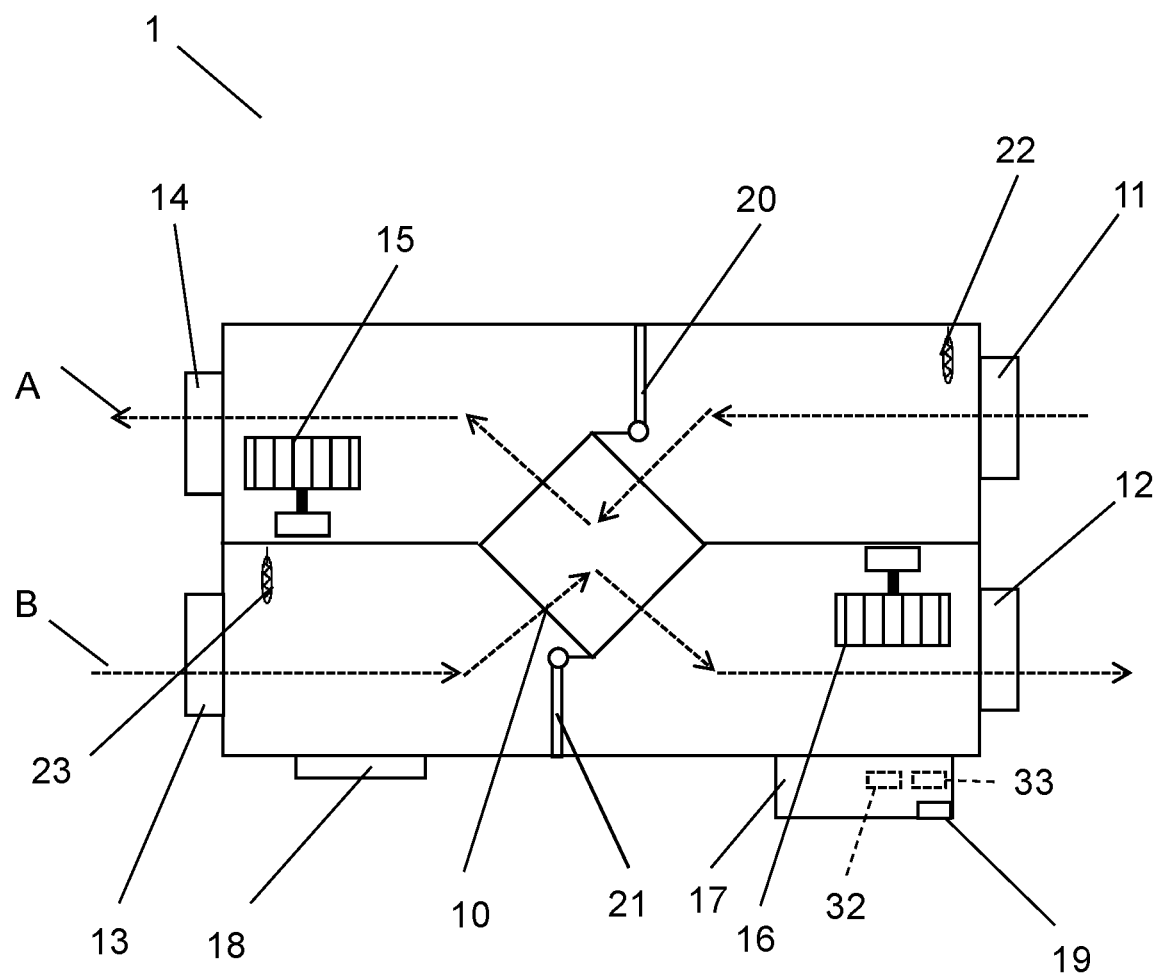
FIG. 2 is a schematic cross-sectional diagram illustrating a configuration of a heat exchanging ventilation device according to Embodiment 1 of the present disclosure.
Figure 3:
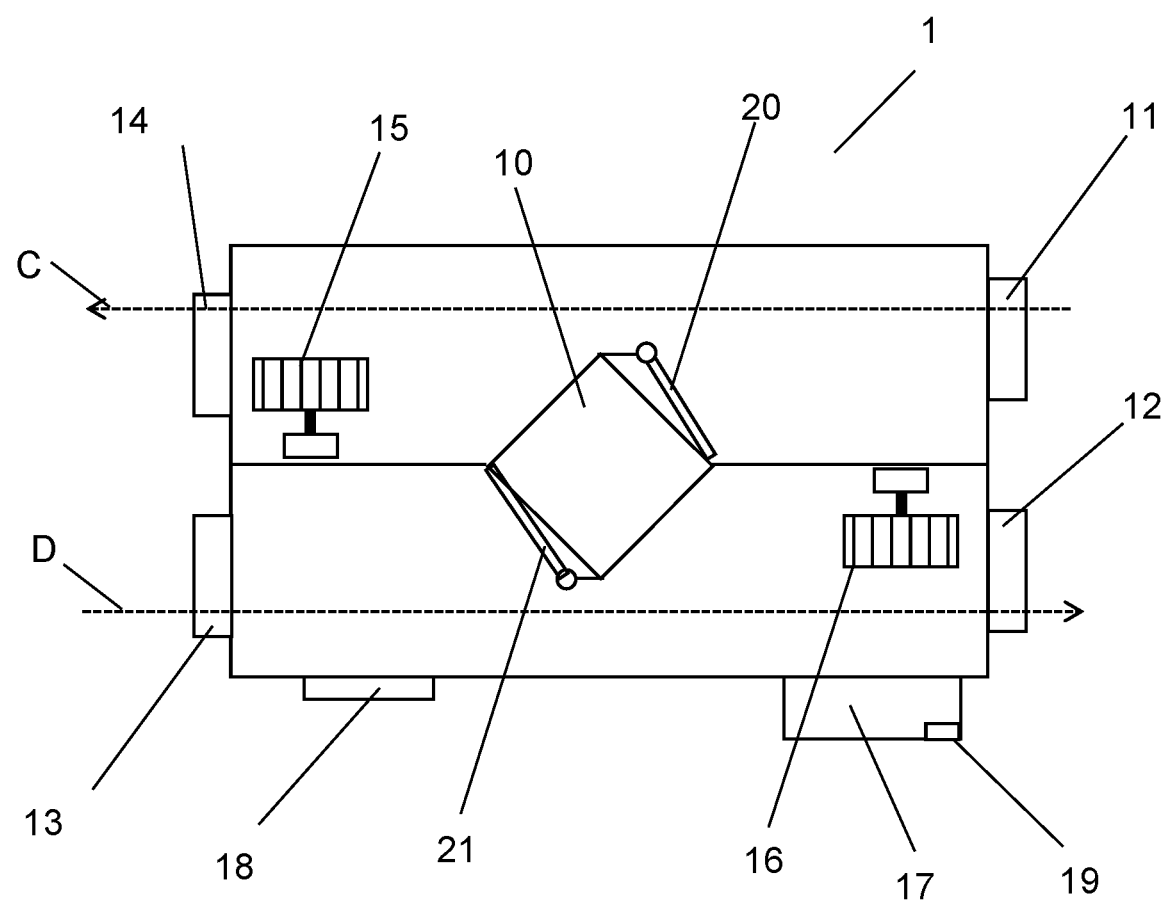
FIG. 3 is a schematic cross-sectional diagram illustrating a configuration of the heat exchanging ventilation device according to Embodiment 1 of the present disclosure.

Subsequently, heat exchanging ventilation device 1 will be described with reference to FIG. 2 and FIG. 3. Note that each of FIGS. 2 and 3 is a schematic cross-sectional diagram illustrating a configuration of heat exchanging ventilation device 1. In particular, FIG. 3 illustrates a change of the state of an air duct with a damper.

Heat exchanging ventilation device 1 includes heat exchange element 10, outdoor-side inlet port 11, outdoor-side outlet port 12, indoor-side inlet port 13, indoor-side outlet port 14, air supply fan 15, exhaust fan 16, heat exchanger control unit 17, operating unit 18, heat exchanger receiving unit 19, air supply damper 20, exhaust damper 21, outdoor temperature sensor 22, and indoor temperature sensor 23.

Heat exchange element 10 has a function of collecting heat of air exhausted from the inside of the building and giving the heat to air supplied from the outside of the building. In other words, heat exchange element 10 exchanges heat between supplied air passing through air supply duct for heat exchange A and exhaust air passing through exhaust duct for heat exchange B.

Outdoor-side inlet port 11 and indoor-side outlet port 14 communicate with each other in air supply duct for heat exchange A via heat exchange element 10. Air supply duct for heat exchange A includes air supply fan 15, air supply damper 20, and outdoor temperature sensor 22.

Air supply fan 15 is a fan located downstream of heat exchange element 10 and configured to produce a flow of air to draw outdoor air into the inside of the building. Air supply fan 15 is connected to a rotating shaft of an air supply motor and configured to, by the rotation of the rotating shaft, draw air from outdoor-side inlet port 11 and discharge air from indoor-side outlet port 14. Note that, in FIG. 2, only one air supply fan 15 is used, but, air supply fan 15 is not particularly limited in number, and two or more of air supply fans 15 may be used.

For the heat exchange operation, air supply damper 20 forms air supply duct for heat exchange A to introduce outdoor air, having been drawn from outdoor-side inlet port 11, into indoor-side outlet port 14 via the heat exchange element, as illustrated in FIG. 2. Furthermore, from a position for forming air supply duct for heat exchange A, air supply damper 20 rotates to block an air supply port to the heat exchange element, whereby air supply duct for ventilation C is formed. Air supply duct for ventilation C is an air duct configured to, in the case of not performing the heat exchange operation, introduce outdoor air, having been drawn from outdoor-side inlet port 11, into indoor-side outlet port 14 not through the heat exchange element as illustrated in FIG. 3. Air supply duct for ventilation C is used, for example, when air supply takes precedence over heat exchange.

Outdoor temperature sensor 22 is provided in the vicinity of outdoor-side inlet port 11 to detect the temperature of outdoor air drawn from the outside of the building.

Indoor-side inlet port 13 and outdoor-side outlet port 12 communicate with each other in exhaust duct for heat exchange B via heat exchange element 10. Exhaust duct for heat exchange B includes exhaust fan 16, exhaust damper 21, indoor temperature sensor 23.

Exhaust fan 16 is a fan located downstream of heat exchange element 10 and configured to produce a flow of air to discharge indoor air to the outside of the building. Exhaust fan 16 is connected to a rotating shaft of an exhaust motor, and configured to, by the rotation of the rotating shaft, supply air from indoor-side inlet port 13 and discharge air from outdoor-side outlet port 12. Note that, in FIG. 2, only one exhaust fan 16 is used, but, exhaust fan 16 is not particularly limited in number, and two or more of exhaust fans 16 may be used.

For the heat exchange operation, exhaust damper 21 forms exhaust duct for heat exchange B to introduce indoor air, having been drawn from indoor-side inlet port 13, into outdoor-side outlet port 12 via the heat exchange element as illustrated in FIG. 2. Furthermore, from a position for forming exhaust duct for heat exchange B, exhaust damper 21 rotates to block an air supply port to the heat exchange element, whereby exhaust duct for ventilation D is formed. Exhaust duct for ventilation D is an air duct configured to, in the case of not performing the heat exchange operation, introduce indoor air, having been drawn from indoor-side inlet port 13, into outdoor-side outlet port 12 not through the heat exchange element as illustrated in FIG. 3. Exhaust duct for ventilation D is used, for example, when exhausting air takes precedence over heat exchange.

Indoor temperature sensor 23 is provided in the vicinity of indoor-side inlet port 13 to detect the temperature of indoor air drawn from the inside of the building.

Each of air supply duct for ventilation C and exhaust duct for ventilation D forms an air duct, based on information received by heat exchanger receiving unit 19, and details thereof will be described later.

Operation unit 18 is a unit for inputting an operation command of heat exchanging ventilation device 1 by button or switch operation, and specifically is a button or switch to transmit commands on operations, such as the operation speed and standby of each of the fans, to heat exchanger control unit 17. Examples of operating unit 18 include a tactile switch and an electrostatic touch switch.

Heat exchanger receiving unit 19 is configured to receive information transmitted from range hood transmitting unit 25 of range hood unit 24. Examples of the information transmitted from range hood unit 24 include the exhaust volume of range hood unit 24.

Heat exchanger control unit 17 includes fan control unit 32 and damper control unit 33, and is configured to control air supply fan 15, exhaust fan 16, air supply damper 20, exhaust damper 21, and other constituents, in accordance with information inputted by operating unit 18 and information received by heat exchanger receiving unit 19, and thereby control a flow of air between the inside and outside of the building. Details of the control will be described later.

Figure 4:
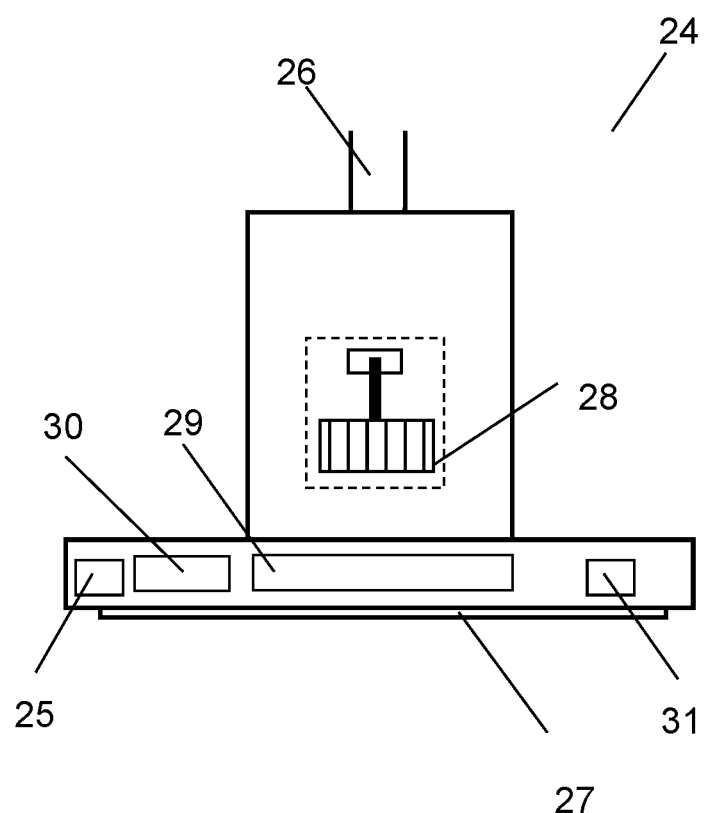
FIG. 4 is a schematic cross-sectional diagram illustrating a configuration of a range hood unit according to Embodiment 1 of the present disclosure.

Subsequently, range hood unit 24 will be described with reference to FIG. 4. Note that FIG. 4 is a schematic cross-sectional diagram illustrating a configuration of range hood unit 24.

Range hood unit 24 is disposed, for example, above a cooking range in the kitchen. Range hood unit 24 includes range hood air exhaust port 26, range hood inlet port 27, range hood fan 28, range hood operating unit 29, range hood sensor unit 31 serving as a concentration sensor, range hood transmitting unit 25, and range hood control unit 30.

Range hood exhaust port 26 is an opening for discharging air in the kitchen, the air having been drawn in from range hood inlet port 27, to the outside of the building by range hood fan 28.

Range hood inlet port 27 is an opening opened downward to draw air in the kitchen into range hood unit 24. In FIG. 4, range hood inlet port 27 is opened downward, but may not necessarily be opened downward, and is only required to draw in air in the kitchen.

Range hood fan 28 is a fan configured to produce a flow of air from range hood inlet port 27 to range hood air exhaust port 26. Range hood fan 28 is connected to a rotating shaft of a range hood motor, and configured to, by the rotation of the rotating shaft, draw in air from range hood inlet port 27 and discharge air from range hood exhaust port 26. Note that, in FIG. 4, only one range hood fan is used, but, the range hood fan is not particularly limited in number, and two or more of range hood fans may be used.

Range hood operating unit 29 is a unit for inputting an operation command to range hood unit 24 by button or switch operation, and specifically is a button or switch to transmit commands on operations, such as the operation speed and stop of range hood fan 28, to range hood control unit 30.

Range hood sensor unit 31 is a device configured to detect the concentration of gas or particles generated in the kitchen. Specifically, range hood sensor unit 31 detects, for example, the concentration of fine particles in air and a toxic gas. Note that, in FIG. 4, the sensor is arranged in the front face of the range hood unit, but may be arranged in any place, such as the inside of range hood inlet port 27, in which the sensor can detect gas and particles generated in the kitchen. Furthermore, instead of the sensor installed in the range hood fan, heat exchanging ventilation device 1 or an external sensor may be used.

Range hood transmitting unit 25 is configured to transmit, to heat exchanging ventilation device 1, information on, for example, the volume of air drawn from the kitchen by range hood inlet port 27, the volume of exhaust from range hood air exhaust port 26, and the concentration of gas and particles detected by range hood sensor unit 31. Note that examples of the volume of exhaust from range hood 24 include the volume of air drawn from the kitchen.

The operation of range hood control unit 30 will be described later.

In each of heat exchanger control unit 17 and range hood control unit 30, a central processing unit (CPU), a random access memory (RAM), a read only memory (ROM), and drivers for driving units, such as dampers and motors in heat exchanging ventilation device 1 and range hood unit 24 are connected via an internal bus. For example, the CPU makes use of the RAM as a workspace, executes a computer program stored in the ROM, and, based on the result of the execution, controls the operations of the driving units by receiving data and commands from the drivers.

Figure 5:
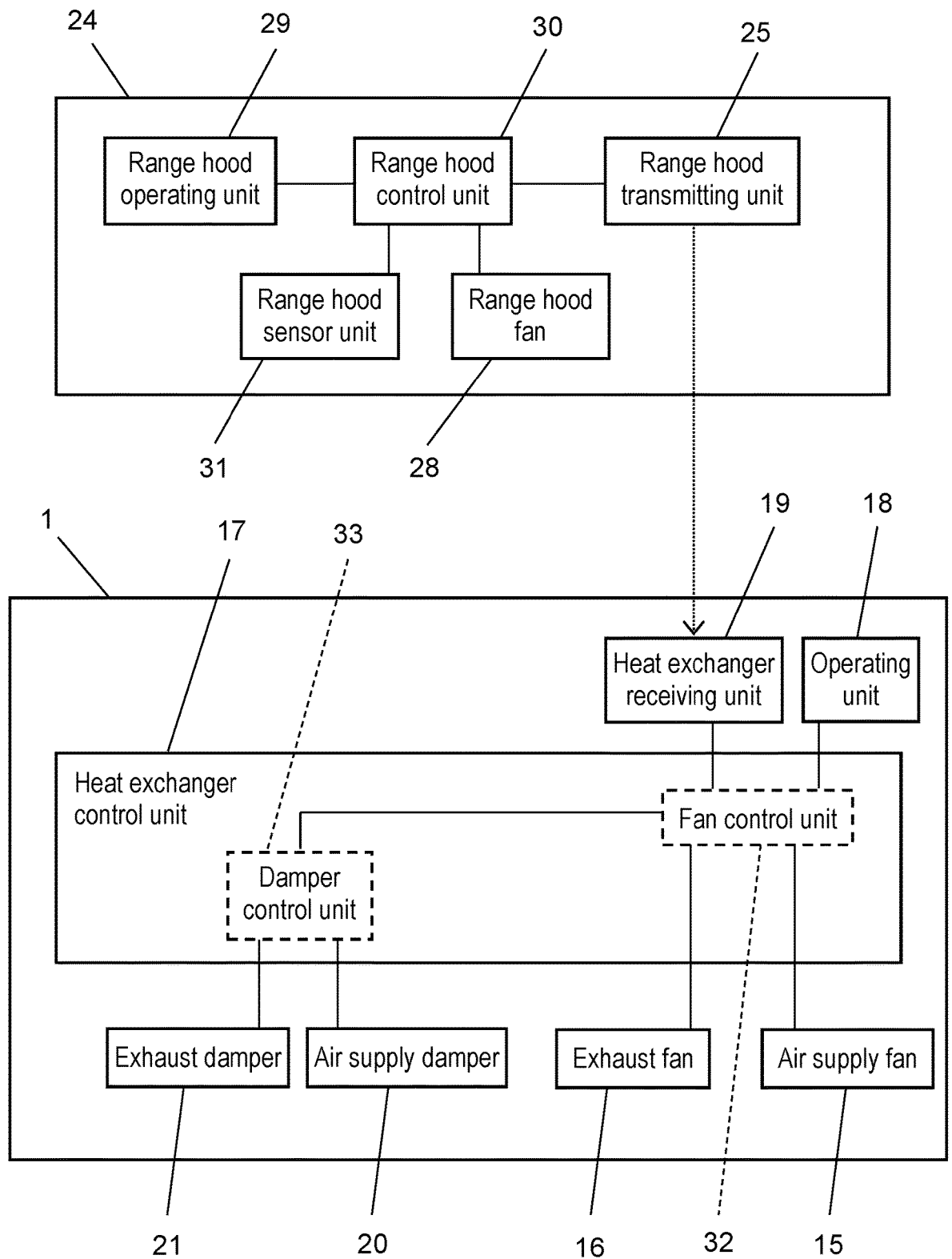
FIG. 5 is a functional block diagram of the heat exchanging ventilation device and the range hood unit according to Embodiment 1 of the present disclosure.
Figure 6:
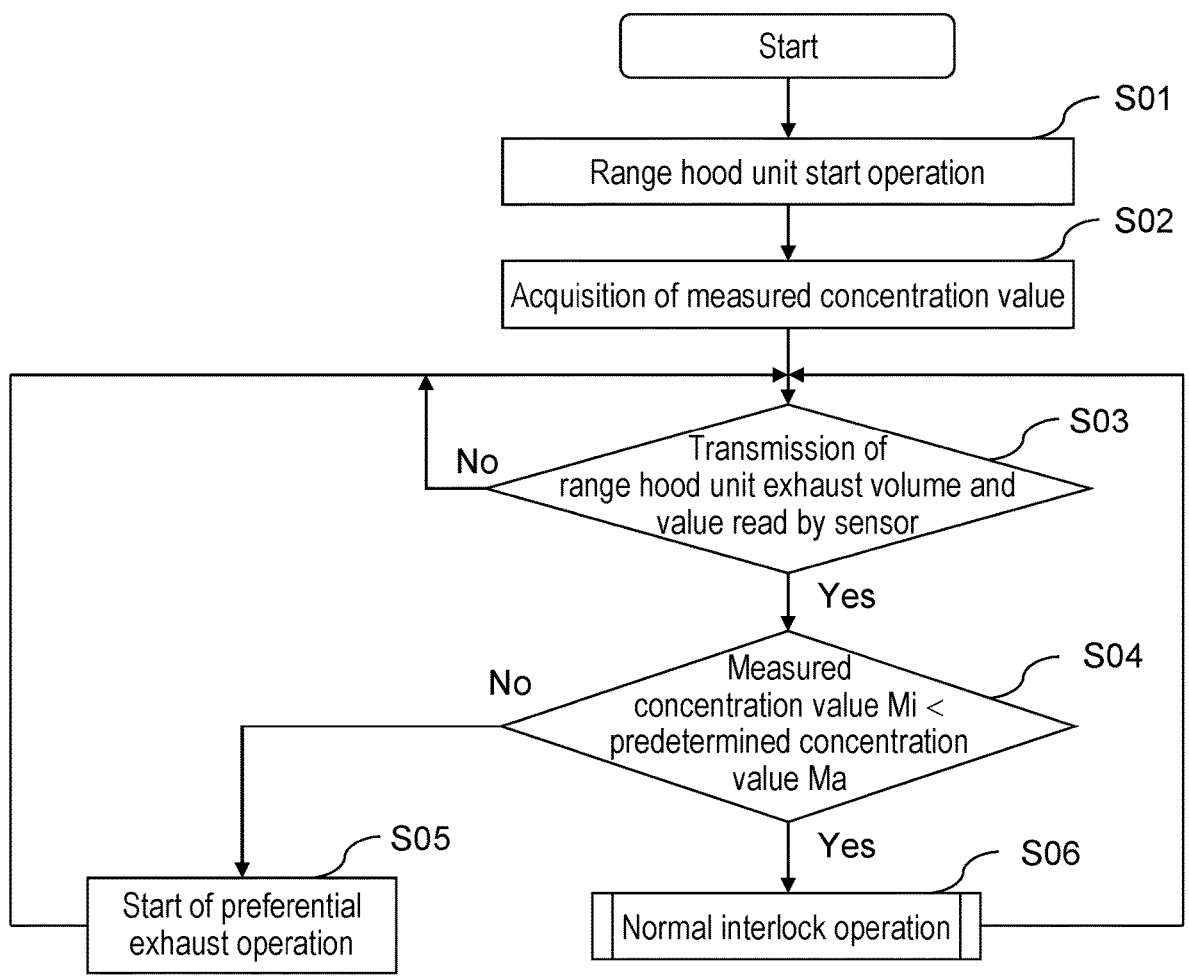
FIG. 6 is a flowchart illustrating an operation of a ventilation system according to Embodiment 1 of the present disclosure.
Figure 7:
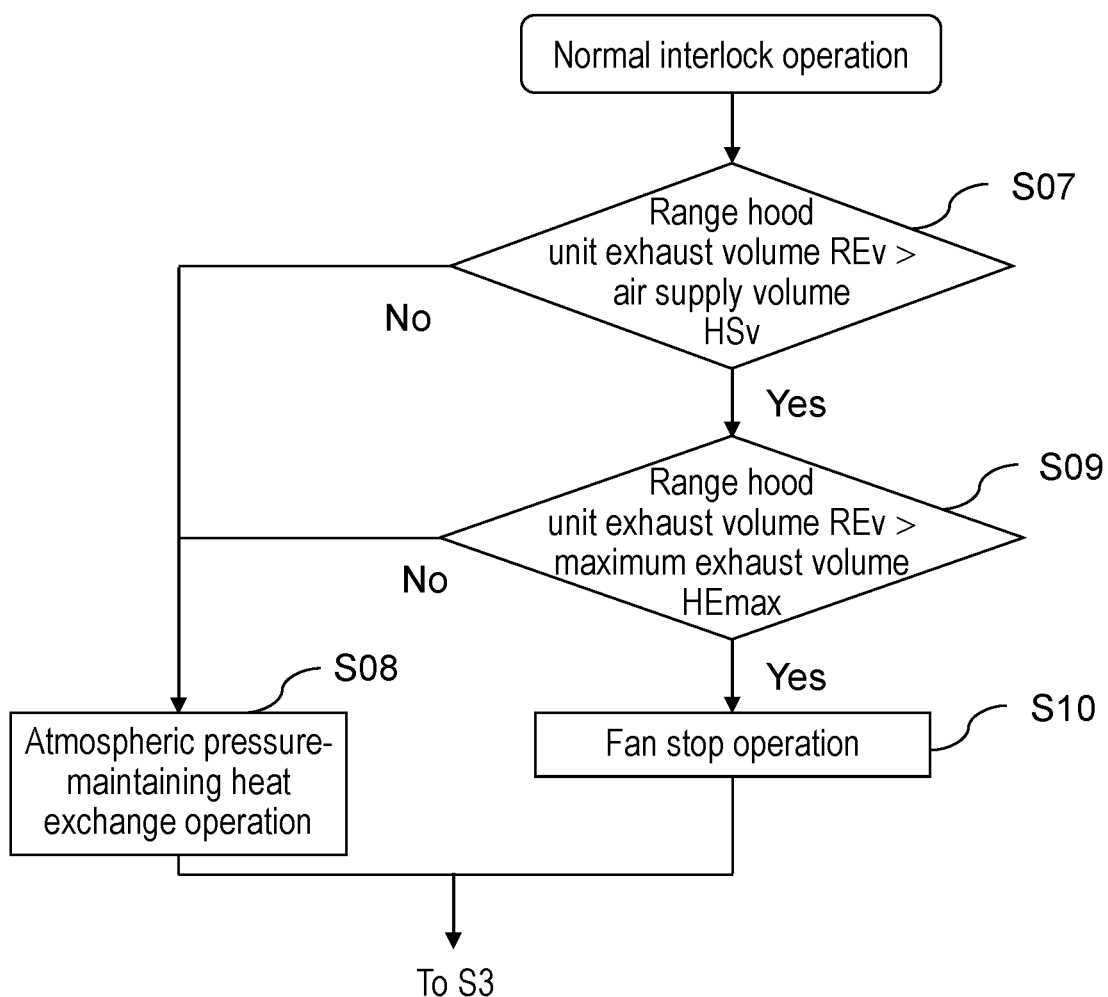
FIG. 7 is a flowchart of a normal interlock operation according to Embodiment 1 of the present disclosure.
Figure 8:
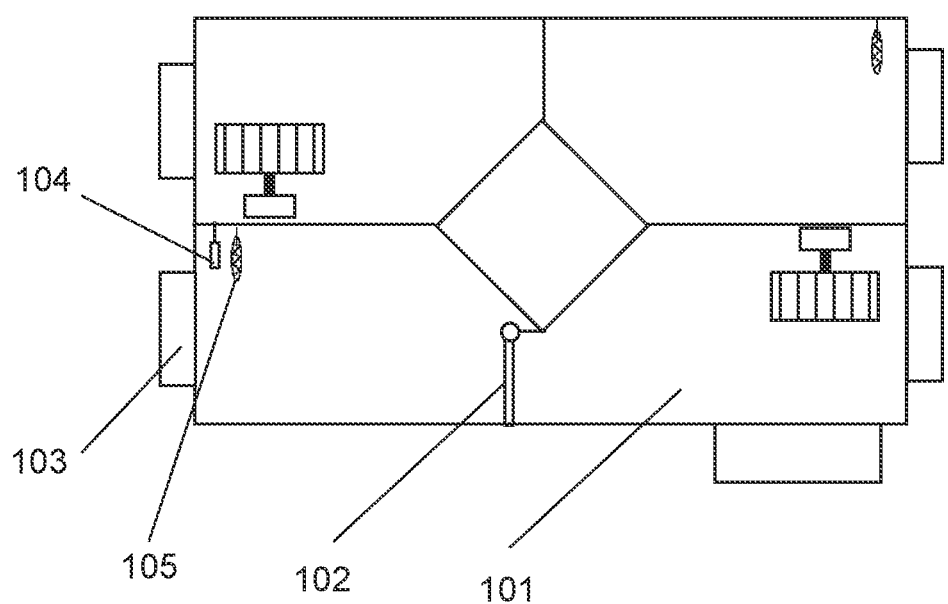
FIG. 8 is a schematic configuration diagram illustrating a configuration of a conventional heat exchanging ventilation device.

Next, the flow of operation of the ventilation system will be described with reference to FIG. 5, FIG. 6, and FIG. 7. Note that FIG. 5 is a functional block diagram of heat exchanging ventilation device 1 and range hood unit 24; FIG. 6 is a flowchart illustrating an operation of the ventilation system; and FIG. 7 is a flowchart of a normal interlock operation. The letter "S" in FIG. 6 and FIG. 7 refers to a step. To provide an understanding of the operation, it is assumed that heat exchanging ventilation device 1 performs a typical regular operation as an initial operation, more specifically, makes use of air supply duct for heat exchange A and exhaust duct for heat exchange B (in the open state) and operates under a state in which the air supply volume HSv of air supply fan 15 is equivalent to the exhaust volume HEv of exhaust fan 16.

In a state in which heat exchanging ventilation device 1 is performing the regular operation, first, a user transmits signals indicating operation start and a range hood unit exhaust volume REv, such as high-powered operation or low-powered operation, to range hood unit control unit 30 via range hood operating unit 29. Range hood control unit 30 receives the signal indicating the operation start, and rotates a range hood exhaust fan in accordance with the set range hood unit exhaust volume REv (FIG. 6: S01).

Next, range hood control unit 30 measures the concentration of gas and particles in the kitchen, via the range hood sensor unit 31, and obtains the measured concentration (FIG. 6: S02).

Range hood control unit 30 transmits information on the range hood unit exhaust volume REv and a measured concentration value Mi to heat exchanging ventilation device 1 via range hood transmitting unit 25 (FIG. 6: Yes at S03→S04).

Note that, in the case where, although range hood unit 24 is powered on, the setting of an exhaust volume is not inputted, or in the case where an input is provided by range hood operating unit 29 so as not to allow heat exchanging ventilation device 1 and range hood unit 24 to work in an interlocked manner, the operation of range hood unit 24 only is started without transmitting the information on the range hood unit exhaust volume REv and the measured concentration value Mi (FIG. 6: No at S03).

In heat exchanging ventilation device 1, when heat exchanger receiving unit 19 receives the information on the range hood unit exhaust volume REv and the measured concentration value Mi, heat exchanger control unit 17 first compares the measured concentration value Mi with a predetermined concentration value Ma (FIG. 6: S04).

Here, if the measured concentration value Mi is larger than the predetermined concentration value Ma, heat exchanger control unit 17 performs a preferential exhaust operation, regardless of the range hood unit exhaust volume REv (FIG. 6: No at S04→S05).

In the preferential exhaust operation, heat exchanger control unit 17 operates heat exchanging ventilation device 1 at the maximum exhaust volume by operating exhaust fan 16 at the maximum capacity via fan control unit 32. Furthermore, heat exchanger control unit 17 stops air supply fan 15 via fan control unit 32 to stop air supply operation. Furthermore, heat exchanger control unit 17 controls air supply damper 20 and exhaust damper 21 via damper control unit 33 to open an air supply duct provided independently from the air ducts for heat exchange. Specifically, heat exchanger control unit 17 switches from air supply duct for heat exchange A to air supply duct for ventilation C. In addition, heat exchanger control unit 17 switches from exhaust duct for heat exchange B to exhaust duct for ventilation D. Furthermore, range hood control unit 30 performs an operation to control range hood fan 28 and thereby maximum the range hood unit exhaust volume REv.

Thus, although range hood unit 24 and heat exchanging ventilation device 1 exhaust air at the maximum capacity, range hood unit 24 and heat exchanging ventilation device 1 supply air by making use of air supply duct for ventilation C, which has lower resistance than the air ducts for heat exchange, and therefore, indoor air can be exhausted at the maximum air volume, and the inside of the building can be prevented from being put under negative pressure.

For example, in the case where range hood sensor unit 31 is a sensor configured to measure a $CO_2$ concentration, the predetermined concentration value Ma is desirably 5,000 ppm, which is a long-term safety critical concentration, but is not particularly limited to this value.

During the preferential exhaust operation, heat exchanger control unit 17 acquires the measured concentration value Mi from range hood unit 24 all the time, and compares the measured concentration value Mi with the predetermined concentration value Ma, and repeats the preferential exhaust operation until the concentration measured value Mi becomes smaller than the predetermined concentration value Ma (FIG. 6: S05→S03→S04).

If the concentration measured value Mi is smaller than the predetermined concentration value Ma, heat exchanging ventilation device 1 performs the normal interlock operation in accordance with the range hood unit exhaust volume (FIG. 6: Yes at S04→S06).

In the normal interlock operation, heat exchanger control unit 17 compares range hood unit exhaust volume REv acquired via heat exchanger receiving unit 19 with the air supply volume HSv during the regular operation of heat exchanging ventilation device 1 (FIG. 6: S07). Here, the air supply volume HSv refers to an air supply volume during the regular operation in which heat exchanging ventilation device 1 uses air supply duct for heat exchange A to supply air to the inside of the building by driving air supply fan 15. In contrast, the exhaust volume HEv refers to an exhaust volume during the regular operation in which heat exchanging ventilation device 1 uses exhaust duct for heat exchange B to exhaust air from the inside of the building by driving exhaust fan 16. During the normal operation, the air supply volume HSv is equivalent to the exhaust volume HEv. In other words, a comparative target may be changed from the air supply volume HSv to the exhaust volume HEv.

Here, if the range hood unit exhaust volume REv is smaller than the air supply volume HSv, since heat exchanging ventilation device 1 can prevent the inside of the building from being put under negative pressure caused by exhaust by range hood unit 24, heat exchanging ventilation device 1 performs an atmospheric pressure-maintaining heat exchange operation (FIG. 7: No at S07→S08).

In the atmospheric pressure-maintaining heat exchange operation, in contrast to the regular operation, heat exchanger control unit 17 performs an operation by subtracting range hood unit exhaust volume REv from the exhaust volume HEv of exhaust fan 16. A decrement in the exhaust volume of exhaust fan 16 is equivalent to the range hood unit exhaust volume REv.

Specifically, for example, it is assumed that the range hood unit exhaust volume REv is 100 CFM (Cubic Feet per Minute), the air supply volume HSv during the regular operation is 160 CFM, and the exhaust volume HEv is 160 CFM. In this case, the air supply volume HSv of heat exchanging ventilation device 1 is maintained at 160 CFM, and the exhaust volume HEv is reduced to 60 CFM. In other words, the exhaust volume HEv of heat exchanging ventilation device 1 is reduced by the range hood unit exhaust volume REv.

Alternatively, an operation may be performed in which the air supply volume HSv of heat exchanging ventilation device 1 is increased by the range hood unit exhaust volume REv to be 260 CFM, while the exhaust volume HEv is maintained at 160 CFM. The exhaust volume and the air supply volume are such controlled that the air supply volume HSv of heat exchanging ventilation device 1 is increased by the exhaust volume of the range hood unit, whereby the exhaust volume in the kitchen obtained by adding up the exhaust volume of heat exchanging ventilation device 1 and range hood unit 24 is in agreement with the air supply volume.

Note that, in the atmospheric pressure-maintaining heat exchange operation, if the exhaust volume HEv of heat exchanging ventilation device 1 in operation is smaller than the range hood unit exhaust volume REv, the exhaust volume HEv cannot be reduced by the range hood unit exhaust volume REv. In this case, assuming that a regular operation is such that heat exchanger control unit 17 controls the exhaust volume HEv and the air supply volume HSv to be equal to or larger than the range hood unit exhaust volume REv, the volume in this regular operation is reduced by the range hood unit exhaust volume REv. For example, heat exchanger control unit 17 causes heat exchanging ventilation device 1 to perform an operation by reducing, by the range hood unit exhaust volume Rev, the regular operation at the maximum exhaust volume HEmax and the maximum air supply volume HSmax of heat exchanging ventilation device 1. Note that the maximum exhaust volume HEmax refers to the maximum volume of air exhausted from the inside of the building when heat exchanging ventilation device 1 makes use of exhaust duct for heat exchange B and exhaust fan 16 is driven at the maximum capacity. In contrast, the maximum air supply volume HSmax refers to the maximum volume of air supplied to the inside of the building when heat exchanging ventilation device 1 makes use of air supply duct for heat exchange A and air supply fan 15 is driven at the maximum capacity.

During the atmospheric pressure-maintaining heat exchange operation, if the range hood unit exhaust volume REv is changed in range hood unit 24 or range hood unit 24 stops, heat exchanger control unit 17 receives information on the above-mentioned state, and returns the operation of each unit to the regular operation (FIG. 7: S08→FIG. 6: S03).

If the range hood unit exhaust volume REv is larger than the air supply volume HSv, then heat exchanger control unit 17 compares the range hood unit exhaust volume REv with the maximum exhaust volume HEmax of heat exchanging ventilation device 1 (FIG. 7: S07→S09).

Here, if the range hood unit exhaust volume REv exceeds the maximum exhaust volume HEmax, a fan stop operation is performed (FIG. 7: Yes at S09→S10).

The fan stop operation is performed such that heat exchanger control unit 17 stops the exhaust operation as the regular operation by exhaust fan 16 and air supply operation as the regular operation by air supply fan 15. Furthermore, heat exchanger control unit 17 switches from air supply duct for heat exchange A to air supply duct for ventilation C, in other words, opens air supply duct for ventilation C. Thus, in the case where the exhaust capacity of range hood unit 24 exceeds the air supply capacity of heat exchanging ventilation device 1, air supply duct for heat exchange A, which produces a high pressure loss, is not made use of, that is, air supply duct for ventilation C functions as a natural air supply opening, whereby the kitchen can be prevented from being put under negative pressure. In this case, exhaust duct for heat exchange B may be switched over to exhaust duct for ventilation D. The switching over to the exhaust duct for ventilation D makes it possible to use exhaust duct for ventilation D for air supply and enhance the effect of substantially preventing the kitchen from being put under negative pressure.

During the fan stop operation, if the range hood unit exhaust volume REv is changed in range hood unit 24 or range hood unit 24 stops, heat exchanger control unit 17 receives information on the above-mentioned state, and returns the operation of each unit to the regular operation (FIG. 7: S10→FIG. 6: S03).

If the range hood unit exhaust volume REv does not exceed the maximum exhaust volume HEmax, heat exchanging ventilation device 1 can cope with a state with a negative pressure caused by exhaustion by range hood unit 24, and therefore, performs the above-described atmospheric pressure-maintaining heat exchange operation (FIG. 7: No at S09→S08).

Note that, in the above-described step S09, heat exchanger control unit 17 compares range hood unit exhaust volume REv with the maximum exhaust volume HEmax of heat exchanging ventilation device 1. However, heat exchanging ventilation device 1 usually exercises control to make air supply and exhaust equivalent. In other words, the maximum exhaust volume HEmax and the maximum air supply volume HSmax differ in the direction of air flow, but are of the same air volume. Hence, heat exchanger control unit 17 can compare the range hood unit exhaust volume REv with the maximum air supply volume HSmax.

The above-described flow is a process flow in the ventilation system according to the present embodiment.

In the above-described process flow, the fan stop operation at the above-described step S10 is exercised by stopping exhaust operation as the regular operation by exhaust fan 16 and air supply operation as the normal operation by air supply fan 15 are stopped. Then, heat exchanger control unit 17 switches from air supply duct for heat exchange A to air supply duct for ventilation C.

However, instead of the fan stop operation, an air supply fan stop operation may be performed.

In the air supply fan stop operation, heat exchanger control unit 17 stops the air supply operation as the normal operation by air supply fan 15, but, exercises exhaust operation as the regular operation by exhaust fan 16. Furthermore, if a difference between an indoor temperature $T_i$ detected by indoor temperature sensor 23 and an outdoor temperature $T_o$ detected by outdoor temperature sensor 22 is bigger than a predetermined temperature $T_a$ stored in advance, heat exchanger control unit 17 does not switch from air supply duct for heat exchange A to air supply duct for ventilation C, and does not switch from exhaust duct for heat exchange B to exhaust duct for ventilation D. In other words, only the exhaust operation is performed using the air ducts for heat exchange.

In the case where the ventilation capacity of heat exchanging ventilation device 1 is lower than that of range hood unit 24, heat exchanging ventilation device 1 cannot be operated with the exhaust volume and the air supply volume in the kitchen being in agreement with each other. In this case, only the air supply fan is stopped and air supply from the outside of the building is performed by making use of an indoor negative pressure.

Thus, in the case where the exhaust capacity of range hood unit 24 exceeds the air supply capacity of heat exchanging ventilation device 1, heat exchange can be performed by making use of a negative pressure in the kitchen. In this case, the kitchen cannot be avoided from being put under the negative pressure, but, by making use of the air ducts for heat exchange, the negative pressure is not a little canceled, and furthermore, the need for energy for operating air supply fan 15 is eliminated.

The air supply fan stop operation can be made use of even when the range hood unit exhaust volume REv does not exceed the maximum exhaust volume HEmax.

Note that, in the present embodiment, heat exchanging ventilation device 1 is targeted at only an indoor space including a kitchen. However, for example, a residence is designed to have high airtightness between the inside and outside of the residence, but, have sufficient ventilation between one room and another room in the residence. Therefore, when the above-described process is conducted in the kitchen, the above-described effect can be expected for the entirety of the residence.

Outline of Embodiment

A ventilation system according to the present disclosure includes a range hood unit configured to exhaust air and a heat exchanging ventilation device configured to supply and exhaust air. The range hood unit includes a range hood transmitting unit configured to transmit information on the operation of the range hood unit. The heat exchanging ventilation device includes: a heat exchanger receiving unit configured to receive the information from the range hood transmitting unit; and a heat exchanger control unit configured to operate the heat exchanging ventilation device, based on the information received by the heat exchanger receiving unit.

Thus, the range hood unit and the heat exchanging ventilation device can be operated in an interlocked manner, and accordingly, the operation mode and air volume of the heat exchanging ventilation device can be changed in accordance with the operation air volume of the range hood unit.

The information is the exhaust volume of the range hood unit in operation, and the heat exchanger control unit is configured to decrease the exhaust volume of the heat exchanging ventilation device, based on the exhaust volume of the range hood unit that has been received by the heat exchanger receiving unit.

Thus, even with a conventional manner of using the range hood unit, the inside of a building can be substantially prevented from being put under negative pressure, and therefore, for example, difficulty in opening and closing a door can be removed, and also a wind noise generated when air is drawn in a kitchen can be prevented.

The decrease in the exhaust volume is produced by subtracting the exhaust volume of the range hood unit from the exhaust volume equivalent to the air supply volume of the heat exchanging ventilation device.

Thus, in an indoor space, the total volume of the air supply volume and the exhaust volume can be made constant also during the operation of the range hood unit, and therefore, the inside of a building can be prevented from being put under negative pressure.

When the exhaust volume of the range hood unit that has been received by the heat exchanger receiving unit exceeds the maximum exhaust volume of the heat exchanging ventilation device, the heat exchanging ventilation device performs an exhaust operation using a fan, stops an air supply operation using a fan, and opens an air supply duct provided independently of an air duct for heat exchange.

Thus, even when the exhaust volume of the range hood unit is large and exceeds the maximum exhaust volume of the heat exchanging ventilation device, opening the air supply duct allows an air supply volume equivalent to the exhaust volume of the range hood unit to be secured, whereby the indoor space can be prevented from being put under negative pressure.

The information is the exhaust volume of the range hood unit in operation, and the heat exchanger control unit may increase the air supply volume of the heat exchanging ventilation device, based on the exhaust volume of the range hood unit that has been received by the heat exchanger receiving unit.

Thus, during the operation of the range hood unit, not only the exhaust volume of the heat exchanging ventilation device is reduced, but also the air supply volume can be increased, and thus, the optimal operation of the heat exchanging ventilation device can be determined in accordance with the exhaust volume of the range hood unit.

The increase in the air supply volume may be produced by adding the exhaust volume of the range hood unit to the air supply volume equivalent to the exhaust volume in the heat exchanging ventilation device.

Thus, in an indoor space, also during the operation of the range hood unit, the total volume of the air supply volume and the exhaust volume in the indoor space can be made constant, and therefore, the inside of a building can be prevented from being put under negative pressure.

When the exhaust volume of the range hood unit that has been received by the heat exchanger receiving unit exceeds the maximum air supply volume of the heat exchanging ventilation device, the heat exchanging ventilation device stops an exhaust operation using a fan and an air supply operation using a fan, and opens an air supply duct provided independently of an air duct for heat exchange.

Thus, even when the exhaust volume of the range hood unit is large and exceeds the maximum air supply volume of the heat exchanging ventilation device, opening the air supply duct allows an air supply volume equivalent to the exhaust volume of the range hood unit to be secured, whereby the indoor space can be prevented from being put under negative pressure.

The information is the exhaust volume of the range hood unit in operation, and, based on the exhaust volume of the range hood unit that has been received by the heat exchanger receiving unit, the heat exchanger control unit performs an exhaust operation using a fan, stops an air supply operation using a fan, and perform heat exchange by using an air duct for heat exchange.

Thus, even when the air supply operation using the fan is stopped, if a difference in temperature between the indoor space and the outside is large, ventilation can be provided via the heat exchange element.

When the exhaust volume of the range hood unit that has been received by the heat exchanger receiving unit exceeds the maximum air supply volume of the heat exchanging ventilation device, the heat exchanging ventilation device may perform an exhaust operation using a fan, stop an air supply operation using a fan, and perform heat exchange by using an air duct for heat exchange.

Thus, even when the exhaust volume of the range hood unit is large and exceeds the maximum exhaust volume of the heat exchanging ventilation device, ventilation can be provided via the heat exchange element.

The range hood unit may include a concentration sensor configured to detect the concentration of at least one of gas and particles. The information may be the concentration detected by the concentration sensor. The heat exchanging ventilation device may control the air supply volume and exhaust volume of the heat exchanging ventilation device, based on the concentration having been received by the heat exchanger receiving unit.

Thus, the concentration of at least one of gas and particles that are hazardous to humans can be detected in an indoor space, and such a hazardous state can be immediately eliminated.

When the concentration having been received by the heat exchanger receiving unit exceeds a predetermined concentration, the heat exchanging ventilation device stops an air supply operation using a fan, opens an air supply duct provided independently of an air duct for heat exchange, and perform an exhaust operation using a fan at the maximum exhaust volume.

Thus, in the case where the concentration of at least one of gas and particles that are hazardous to humans reaches a concentration dangerous to humans, such dangerous state can be avoided by rapidly exhausting air in an indoor space

INDUSTRIAL APPLICABILITY

The ventilation system according to the present disclosure is useful as a ventilation system configured to, by adjusting an air supply volume and an exhaust volume, prevent the inside of a building from being put under negative pressure.

REFERENCE MARKS IN THE DRAWINGS

1 . . . heat exchanging ventilation device
2 . . . indoor-side outlet port

3 . . . indoor-side exhaust duct
4 . . . outdoor-side air supply port
5 . . . outdoor-side air supply duct
6 . . . outdoor-side exhaust duct
7 . . . outdoor-side exhaust port
8 . . . indoor-side air supply duct
9 . . . indoor-side air supply port
10 . . . heat exchange element
11 . . . outdoor-side inlet port
12 . . . outdoor-side outlet port
13 . . . indoor-side inlet port
14 . . . indoor-side outlet port
15 . . . air supply fan
16 . . . exhaust fan
17 . . . heat exchanger control unit
18 . . . operating unit
19 . . . heat exchanger receiving unit
20 . . . air supply damper
21 . . . exhaust damper
22 . . . outdoor temperature sensor
23 . . . indoor temperature sensor
24 . . . range hood unit
25 . . . range hood transmitting unit
26 . . . range hood air exhaust port
27 . . . range hood inlet port
28 . . . range hood fan
29 . . . range hood operating unit
30 . . . range hood control unit
31 . . . range hood sensor unit
Mi . . . measured concentration value
Ma . . . predetermined concentration value
REv . . . range hood unit exhaust volume
HEv . . . exhaust volume
HSv . . . air supply volume
HSmax . . . maximum air supply volume
HEmax . . . maximum exhaust volume
$T_i$ . . . indoor temperature $T_o$ . . . outdoor temperature
$T_a$ . . . predetermined temperature

The invention claimed is:
1. A ventilation system, comprising:
a range hood unit configured to exhaust air; and
a heat exchanging ventilation device configured to supply and exhaust air,
the range hood unit including
a range hood transmitter configured to transmit information on an operation of the range hood unit,
the heat exchanging ventilation device including:
a heat exchanger receiver configured to receive the information from the range hood transmitter; and
a heat exchanger controller configured to operate the heat exchanging ventilation device, based on the information received by the heat exchanger receiver,
wherein:
the information is an exhaust volume of the range hood unit in operation, and
the heat exchanger controller is configured to decrease an exhaust volume of the heat exchanging ventilation device, based on the exhaust volume of the range hood unit, the exhaust volume of the range hood unit having been received by the heat exchanger receiver.
2. The ventilation system according to claim 1, wherein the decrease in the exhaust volume of the heat exchanging ventilation device is produced by subtracting the exhaust volume of the range hood unit from an air supply volume of the heat exchanging ventilation device.

3. The ventilation system according to claim 1, wherein the heat exchanging ventilation device is configured to:
when the exhaust volume of the range hood unit, having been received by the heat exchanger receiver, exceeds a maximum exhaust volume of the heat exchanging ventilation device,
perform an exhaust operation using an exhaust fan,
stop an air supply operation using an air supply fan, and
open an air supply duct provided independently of an air duct for heat exchange.
4. A ventilation system, comprising:
a range hood unit configured to exhaust air; and
a heat exchanging ventilation device configured to supply and exhaust air,
the range hood unit including
a range hood transmitter configured to transmit information on an operation of the range hood unit,
the heat exchanging ventilation device including:
a heat exchanger receiver configured to receive the information from the range hood transmitter; and
a heat exchanger controller configured to operate the heat exchanging ventilation device, based on the information received by the heat exchanger receiver
wherein:
the information is an exhaust volume of the range hood unit in operation, and
the heat exchanger controller is configured to increase an air supply volume of the heat exchanging ventilation device, based on the exhaust volume of the range hood unit, the exhaust volume of the range hood unit having been received by the heat exchanger receiving unit; and
the increase in the air supply volume is produced by adding the exhaust volume of the range hood unit to an exhaust volume of the heat exchanging ventilation device.
5. The ventilation system according to claim 4, wherein the heat exchanging ventilation device is configured to:
when the exhaust volume of the range hood unit, having been received by the heat exchanger receiver, exceeds a maximum air supply volume of the heat exchanging ventilation device,
stop an exhaust operation using an exhaust fan and an air supply operation using an air supply fan, and
open an air supply duct provided independently of an air duct for heat exchange.
6. A ventilation system, comprising:
a range hood unit configured to exhaust air; and
a heat exchanging ventilation device configured to supply and exhaust air,
the range hood unit including
a range hood transmitter configured to transmit information on an operation of the range hood unit,
the heat exchanging ventilation device including:
a heat exchanger receiver configured to receive the information from the range hood transmitter, and
a heat exchanger controller configured to operate the heat exchanging ventilation device, based on the information received by the heat exchanger receiver
wherein:
the information is an exhaust volume of the range hood unit in operation, and
the heat exchanging ventilation device is configured to:
based on the exhaust volume of the range hood unit, having been received the heat exchanger receiver,
perform an exhaust operation using an exhaust fan,
stop an air supply operation using an air supply fan, and perform heat exchange using an air duct for heat exchange.

7. The ventilation system according to claim 6, wherein the heat exchanging ventilation device is configured to:
when the exhaust volume of the range hood unit, having been received by the heat exchanger receiver, exceeds a maximum exhaust volume of the heat exchanging ventilation device,
perform the exhaust operation using the exhaust fan, and
stop the air supply operation using the air supply fan, and
perform the heat exchange using the air duct for heat exchange.

8. A ventilation system, comprising:
a range hood unit configured to exhaust air; and
a heat exchanging ventilation device configured to supply and exhaust air,
the range hood unit including
a range hood transmitter configured to transmit information on an operation of the range hood unit,
the heat exchanging ventilation device including:
a heat exchanger receiver configured to receive the information from the range hood transmitter, and
a heat exchanger controller configured to operate the heat exchanging ventilation device based on the information received by the heat exchanger receiver
wherein:
the range hood unit further includes a concentration sensor configured to detect a concentration of at least one of gas and particles,
the information is the concentration detected by the concentration sensor, and
the heat exchanging ventilation device is configured to control an air supply volume and an exhaust volume of the heat exchanging ventilation device, based on the concentration having been received by the heat exchanger receiver.

9. The ventilation system according to claim 8, wherein the heat exchanging ventilation device is configured to:
when the concentration having been received by the heat exchanger receiver exceeds a predetermined concentration,
stop an air supply operation using an air supply fan,
open an air supply duct provided independently of an air duct for heat exchange, and
perform an exhaust operation using an exhaust fan at a maximum exhaust volume.

10. A heat exchanging ventilation device configured to supply air and exhaust air, the device comprising:
a heat exchanger receiver which receives information from a range hood transmitter of a range hood unit; and
a heat exchanger controller configured to operate the heat exchanging ventilation device, based on the information having been received by the heat exchanger receiver,
wherein:
the information is an exhaust volume of the range hood unit in operation, and
the heat exchanger controller is configured to decrease an exhaust volume of the heat exchanging ventilation device, based on the exhaust volume of the range hood unit, the exhaust volume of the range hood unit having been received by the heat exchanger receiver.

11. A heat exchanging ventilation device configured to supply air and exhaust air, the device comprising:
a heat exchanger receiver which receives information from a range hood transmitter of a range hood unit; and
a heat exchanger controller configured to operate the heat exchanging ventilation device, based on the information having been received by the heat exchanger receiver,
wherein:
the information is an exhaust volume of the range hood unit in operation,
the heat exchanger controller is configured to increase an air supply volume of the heat exchanging ventilation device, based on the exhaust volume of the range hood unit, the exhaust volume of the range hood unit having been received by the heat exchanger receiver, and
the increase in the air supply volume is produced by adding the exhaust volume of the range hood unit to an exhaust volume of the heat exchanging ventilation device.

12. A heat exchanging ventilation device configured to supply air and exhaust air, the device comprising:
a heat exchanger receiver which receives information from a range hood transmitter of a range hood unit; and
a heat exchanger controller configured to operate the heat exchanging ventilation device, based on the information having been received by the heat exchanger receiver,
wherein:
the information is an exhaust volume of the range hood unit in operation, and
the heat exchanging ventilation device is configured to:
based on the exhaust volume of the range hood unit, having been received the heat exchanger receiver,
perform an exhaust operation using an exhaust fan,
stop an air supply operation using an air supply fan, and
perform heat exchange using an air duct for heat exchange.

13. A heat exchanging ventilation device configured to supply air and exhaust air, the device comprising:
a heat exchanger receiver which receives information from a range hood transmitter of a range hood unit; and
a heat exchanger controller configured to operate the heat exchanging ventilation device, based on the information having been received by the heat exchanger receiver,
wherein:
the range hood unit further includes a concentration sensor configured to detect a concentration of at least one of gas and particles,
the information is the concentration detected by the concentration sensor, and
the heat exchanging ventilation device is configured to control an air supply volume and an exhaust volume of the heat exchanging ventilation device, based on the concentration having been received by the heat exchanger receiver.

* * * * *